United States Patent
Skinner et al.

(10) Patent No.: US 6,435,513 B2
(45) Date of Patent: Aug. 20, 2002

(54) COMBINED BRUSH SEAL AND LABYRINTH SEAL SEGMENT FOR ROTARY MACHINES

(75) Inventors: David Robert Skinner, Pattersonville; Bharat S. Bagepalli, Schenectady; Robert Harold Cromer, Johnstown, all of NY (US); Osman Saim Dinc, Istanbul (TR); Norman Arnold Turnquist, Cobleskill; Christopher Edward Wolfe, Niskayuna, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/791,881

(22) Filed: Feb. 26, 2001

Related U.S. Application Data

(62) Division of application No. 08/839,737, filed on Apr. 15, 1997, now Pat. No. 6,257,586, which is a division of application No. 08/719,667, filed on Sep. 25, 1996, now Pat. No. 5,749,584, which is a continuation-in-part of application No. 08/672,665, filed on Jun. 28, 1996, now abandoned, which is a continuation-in-part of application No. 08/438,228, filed on May 9, 1995, now Pat. No. 6,010,132, which is a division of application No. 08/342,011, filed on Nov. 16, 1994, now Pat. No. 5,474,306, which is a continuation of application No. 07/978,371, filed on Nov. 19, 1992, now abandoned.

(51) Int. Cl.⁷ ............................................. F16J 15/447
(52) U.S. Cl. ..................... 277/303; 277/305; 277/350; 277/355; 277/412
(58) Field of Search .................. 277/303, 305, 277/347, 350, 355, 412, 418, 419, 420, 421, 422

(56) References Cited

U.S. PATENT DOCUMENTS 768,593 A    8/1904    Emmet et al.
779,785 A    1/1905    Junggren
910,472 A    1/1909    Junggren (List continued on next page.)

FOREIGN PATENT DOCUMENTS

| DE | 2938-484 | 3/1981 |
|----|----------|--------|
| EP | 0453315 A1 | 10/1991 |
| GB | 2 191 825 A | 12/1987 |
| GB | 2 301 635 | 12/1996 |
| IT | 421302 | 5/1947 |
| JP | 3-209068 | 9/1991 |
| WO | WO92/05378 | 4/1992 |

OTHER PUBLICATIONS

"Positive Pressure Variable Clearance Packing," Morrison et al.,; GE Turbine Reference Library, May 1990.
"Brush Seal Development for Large Industrial Gas Turbines," Chupp et al., 31$^{st}$ A/AA/ASME/SAE.ASEE Joint Propulsion Conference and Exhibit, Jul. 10–12, 1995.

*Primary Examiner*—Anthony Knight
*Assistant Examiner*—John L. Beres
(74) *Attorney, Agent, or Firm*—Nixon & Vanderhye

(57) ABSTRACT

A brush seal is comprised of arcuate seal segments having ends cut in a radial direction with bristles "canted" at an approximate 45° angle relative to radii of the segments, leaving triangular regions adjacent one end of each segment devoid of bristles at the segment interfaces. The brush seals are retrofit into conventional labyrinth seals with the backing plate for the bristles comprising a labyrinth tooth profile extending fully 360° about the seal, including those areas where bristles are not present. The sealing capacity is not substantially degraded, while affording significant sealing improvements over conventional labyrinth seals. Additionally, when retrofit into labyrinth seals with radial movement, the individual labyrinth seal segments are free to move radially independently of one another during transients.

10 Claims, 5 Drawing Sheets

U.S. PATENT DOCUMENTS

| | | | |
|---|---|---|---|
| 957,887 A | 5/1910 | Junggren |
| 980,282 A | 1/1911 | Junggren |
| 1,352,277 A | 9/1920 | Junggren |
| 1,352,278 A | 9/1920 | Junggren |
| 1,505,647 A | 8/1924 | Junggren |
| 1,505,924 A | 8/1924 | Warren |
| 1,536,014 A | 4/1925 | Junggren |
| 1,594,838 A | 8/1926 | Kigresse |
| 1,651,855 A | 12/1927 | Warren |
| 1,670,071 A | 5/1928 | Junggren |
| 1,689,735 A * | 10/1928 | Losel |
| 1,857,961 A * | 5/1932 | Lamb |
| 1,895,930 A | 1/1933 | Junggren |
| 2,242,673 A * | 5/1941 | Hanzlik |
| 2,336,323 A | 12/1943 | Warren |
| 2,543,615 A * | 2/1951 | Trumpler |
| 2,600,991 A | 6/1952 | Hargrove |
| 2,709,338 A | 5/1955 | Morley et al. |
| 3,186,168 A | 6/1965 | Ormerod et al. |
| 3,463,498 A | 8/1969 | Bill |
| 3,759,038 A | 9/1973 | Scalzo et al. |
| 4,057,362 A * | 11/1977 | Schwaebel |
| 4,195,476 A | 4/1980 | Wood |
| 4,202,554 A | 5/1980 | Snell |
| 4,358,120 A | 11/1982 | Moore |
| 4,403,779 A * | 9/1983 | Wilkinson |
| 4,415,309 A | 11/1983 | Atterbury |
| 4,422,288 A | 12/1983 | Steber |
| 4,541,741 A | 9/1985 | Woodbridge |
| 4,567,730 A | 2/1986 | Scott |
| 4,580,346 A | 4/1986 | Reichl |
| 4,730,876 A | 3/1988 | Werner et al. |
| 4,756,536 A | 7/1988 | Belcher |
| 4,781,388 A | 11/1988 | Worhl |
| 4,785,623 A | 11/1988 | Reynolds |
| 4,809,990 A | 3/1989 | Merz |
| 4,901,522 A | 2/1990 | Commaret et al. |
| 4,924,817 A * | 5/1990 | Seelen |
| 4,971,336 A | 11/1990 | Ferguson |
| 4,989,886 A | 2/1991 | Rulis |
| 5,002,288 A | 3/1991 | Morrison et al. |
| 5,026,075 A * | 6/1991 | Massarani |
| 5,026,252 A | 6/1991 | Hoffelner |
| 5,029,875 A | 7/1991 | Spain et al. |
| 5,029,876 A | 7/1991 | Orlando et al. |
| 5,066,025 A | 11/1991 | Hanrahan |
| 5,074,748 A | 12/1991 | Hagle |
| 5,076,590 A | 12/1991 | Steinetz et al. |
| 5,090,710 A | 2/1992 | Flower |
| 5,106,104 A | 4/1992 | Atkinson et al. |
| 5,110,033 A | 5/1992 | Noone et al. |
| 5,114,159 A | 5/1992 | Baird et al. |
| 5,135,237 A | 8/1992 | Flower |
| 5,174,582 A | 12/1992 | Ferguson |
| 5,176,389 A | 1/1993 | Noone et al. |
| 5,181,728 A | 1/1993 | Stec |
| 5,181,827 A | 1/1993 | Pellow et al. |
| 5,192,084 A | 3/1993 | Norbury |
| 5,201,530 A | 4/1993 | Kelch et al. |
| 5,316,318 A | 5/1994 | Veau |
| 5,318,309 A | 6/1994 | Tseng et al. |
| 5,335,920 A | 8/1994 | Tseng et al. |
| 5,351,971 A | 10/1994 | Short |
| 5,374,068 A | 12/1994 | Jewett et al. |
| 5,400,586 A | 3/1995 | Bagepalli et al. |
| 5,401,036 A | 3/1995 | Basu |
| 5,474,305 A | 12/1995 | Flower |
| 5,474,306 A | 12/1995 | Bagepalli et al. |
| 5,480,165 A | 1/1996 | Flower |
| 5,496,045 A * | 3/1996 | Millener et al. |
| 5,503,405 A | 4/1996 | Jewett et al. |
| 5,509,780 A | 4/1996 | Synfelt |
| 5,524,340 A | 6/1996 | Galbraith et al. |
| 5,547,340 A | 8/1996 | Dalton |
| 5,597,167 A | 1/1997 | Snyder |
| 5,599,026 A | 2/1997 | Sanders et al. |
| 5,630,590 A | 5/1997 | Bouchard et al. |

* cited by examiner

Fig. 1 *(PRIOR ART)*
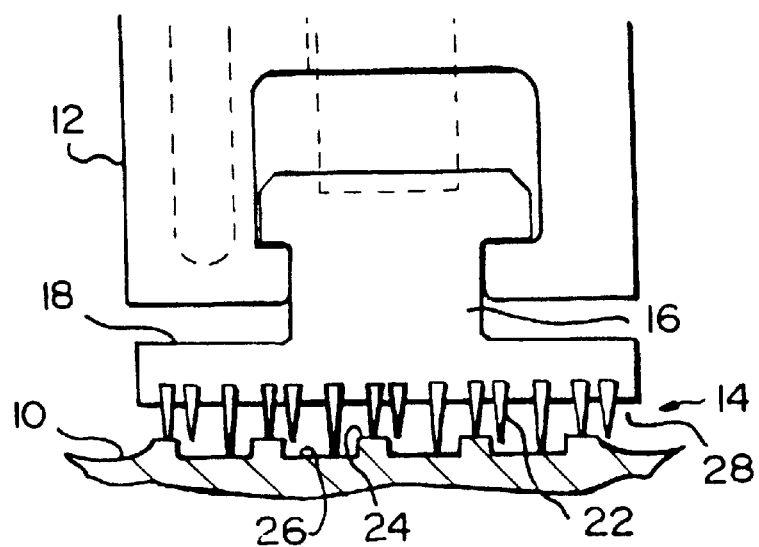
Fig. 2 *(PRIOR ART)*
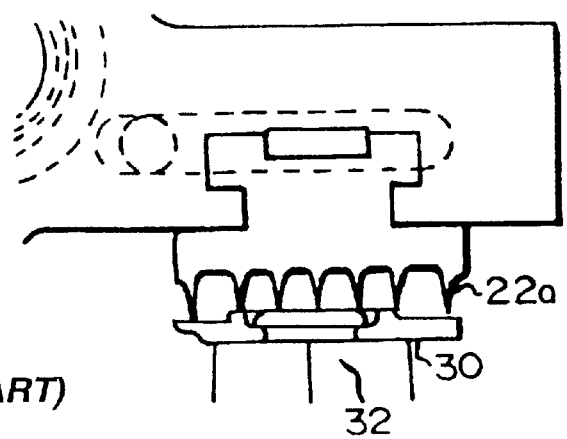

COMBINED BRUSH SEAL AND LABYRINTH SEAL SEGMENT FOR ROTARY MACHINES

RELATED APPLICATIONS

This application is a divisional of application Ser. No. 08/839,737, filed Apr. 15, 1997, now U.S. Pat. No. 6,257,586, which, in turn, is a divisional of application Ser. No. 08/719,667, filed Sep. 25, 1996, now U.S. Pat. No. 5,749,584, which, in turn, is a continuation-in-part of application Ser. No. 08/672,665, filed Jun. 28, 1996, now abandoned, which in turn is a continuation-in-part of application Ser. No. 08/438,228, filed May 9, 1995, now U.S. Pat. No. 6,010,132, which in turn is a divisional application of Ser. No. 08/342,011, filed Nov. 16, 1994, now U.S. Pat. No. 5,474,306 and which, in turn, is a continuation of application Ser. No. 07/978,371, filed Nov. 19, 1992, now abandoned, the disclosures of which are incorporated herein by reference.

TECHNICAL FIELD

The present invention relates to brush seals for rotary machines such as steam and gas turbines and particularly relates to brush seals and labyrinth-brush seal combinations for use with rotary machines.

BACKGROUND

Rotary machines, such as steam and gas turbines, used for power generation and mechanical drive applications are generally large machines consisting of multiple turbine stages. In turbines, high pressure fluid flowing through the turbine stages must pass through a series of stationary and rotating components, and seals between the stationary and rotating components are used to control leakage. The efficiency of the turbine is directly dependent on the ability of the seals to prevent leakage, e.g., between the rotor and stator. Turbine designs are conventionally classified as either impulse, with the majority of the pressure drop occurring across fixed nozzles, or reaction, with the pressure drop more evenly distributed between the rotating and stationary vanes. Both designs employ rigid tooth, i.e., labyrinth, seals to control leakage. Traditionally, rigid labyrinth seals of either a hi-lo or straight shaft design are used. These types of seals are employed at virtually all turbine locations where leakage between rotating and stationary components must be controlled. This includes interstage shaft seals, rotor end seals, and bucket (or blade) tip seals. Steam turbines of both impulse and reaction designs typically employ rigid, sharp teeth for rotor/stator sealing. While labyrinth seals have proved to be quite reliable, their performance degrades over time as a result of transient events in which the stationary and rotating components interfere, rubbing the labyrinth teeth into a "mushroom" profile and opening the seal clearance.

Another type of seal used in many environments, including rotary machines, is a brush seal. Brush seals are generally less prone to leakage than labyrinth seals. A brush seal can also accommodate relative radial movement between fixed and rotational components, for example, between a rotor and a stator, because of the flexure of the seal bristles. Brush seals also generally conform better to surface non-uniformities. The result of using brush seals is better sustained rotary machine performance than is generally possible with labyrinth seals.

DISCLOSURE OF THE INVENTION

In accordance with a preferred embodiment of the present invention, there is provided brush seal segments in the environment of a rotary machine such as a turbine. Brush seals per se have general applicability to rotary machines and can be used in lieu of labyrinth seals. Brush seals are advantageous in that context and provide improved sealing, while occupying considerably less axial space as compared with conventional labyrinth seals. As a result, more compact rotary machine, e.g., turbine, designs can be realized. Alternatively, by employing brush seals, the span that would normally be occupied by labyrinth teeth can be used to allow additional turbine stages, resulting in increased turbine efficiency. As a further advantage, application of brush seals at end packing locations can reduce leakage to the point that the need for a gland sealing/exhauster system, for example, in a steam turbine, is eliminated. At rotor end seals, it is also possible to use brush seals in conjunction with face seals. Further, in certain steam rotary machine applications, some leakage is desirable for cooling of components such as rotors. At these locations, brush seals can be used in conjunction with orifices or other flow bypass mechanisms to ensure that the proper amount of leakage is obtained.

A typical brush seal for use in the present invention comprises a bristle pack, i.e., bristles sandwiched between two metallic plates. The bristles are generally alloy steel wires, drawn to a diameter of 0.002–0.006 inches, although the exact diameter depends on the specific seal application. Larger wire diameters are used for seals exposed to a high pressure differential between the upstream and downstream sides. The backing (downstream) plate, or in the present invention a labyrinth tooth, prevents the bristles from deflecting axially under pressure load. As a result, fence height (h) is a critical design variable. Fence height is the distance the bristles extend freely from their support, i.e., the distal end of the support plate or contact points between the bristles and the labyrinth tooth, to their free ends, which typically are in engagement with the rotating component. For a steam turbine application, where the expected maximum radial rotor deflection is approximately 0.040 inches, the fence height must therefore be a minimum of 0.040 inches. Fence heights vary significantly, particularly in gas turbines, depending on the seal location, from 0.030 for bearing seals, to 0.120 for high pressure packing seals to 0.300 for turbine interstage seals.

During shaft radial excursions, the bristles must be able to temporarily deflect without buckling. In order to accommodate these excursions, the bristles are not oriented in a perfectly radial direction, but are instead canted at some angle. Typically, this angle is between 30 and 60 degrees. Increased angles are used to allow for increased radial shaft excursions. If the bristles were straight in a radial direction, the rotor would interfere with the bristles and the bristles would act as columns rather than deflect as beams. This would result in increased wear and not accommodate radial excursions of the shaft.

The bristles of brush seals are typically mounted between a pair of plates or arcuate segments, with the bristles and plates being welded to one another at the ends of the bristles remote from the tips engaging with the opposite component of the seal. Conventionally, the brush seal is cut into a number of segments, typically four, with the cuts at the ends of each of the segments oriented at the same angle as the "cant" angle of the bristles. That is, with the angle of the bristles typically being on the order of 45° relative to radii of the arcuate segments, the ends of each of the segments are likewise cut at the same angle and therefore parallel the linear extent of the bristles as they project from the segment at that segment end. As a result, the bristles lie at an angle affording the capability of accommodating radial excursions of the rotating component. By cutting the segments of the seal at the angles of the bristles, the bristles may be secured at that angle in the segments without loss of bristles, resulting in an assembled seal with a full 360° of bristles for maximum sealing effectiveness.

In certain applications, however, for example conventional labyrinth seals, the labyrinth seal segments are generally cut in a radial direction for ease of manufacturing and assembly. Further, when retrofitting brush seals to existing labyrinth seals or supplying brush seals as original equipment in combination with labyrinth seals, it has been found desirable according to the present invention to cut the brush seal segment ends in a radial direction rather than in the direction of the "cant" of the bristles. This results in making surfaces at the segment end interfaces that are perfectly straight along radii of the segments with no interlocking pieces and no projections that can be damaged during assembly. However, cutting brush seal segments at the ends of the segments inconsistent with the bristle orientation angle, i.e., the cant angle, results in the loss of an area of the bristles. For example, where a brush seal is employed on a fixed component for sealing about a rotating shaft, the bristles of the brush seal are attached to the seal segments along the outer diameter and project radially inwardly at the cant angle. With the ends of the seal segments cut along radii, there are areas at the juncture of the seal segments where no "canted" bristles are present. That is, with the bristles canted, for example, at a 45° angle, and the end segments lying along radii, there is a triangular area on one end of one segment in which bristles do not project. However, in accordance with the present invention, the bristles are backed by a support plate in the form of a labyrinth tooth profile. Thus, the labyrinth tooth extends the full 360° about the seal, serving as a back-up seal in the event of bristle damage and serving as the primary seal in those areas where the bristles are absent by design.

This particular design is useful as a retrofit seal with conventional labyrinth seals or may be used as a stand-alone seal. It is significant in that by cutting the end surfaces of the segments in a radial direction, the individual segments are free to move radially independently of one another. This is particularly important when the brush seals are retrofit to labyrinth seal segments that are spring-backed or held in place by pressure forces and therefore free to move radially during severe rotor/seal interferences.

In a preferred embodiment according to the present invention, there is provided an annular brush seal for disposition between a rotatable component having an axis of rotation and another component about the axis, comprising a plurality of arcuate segments for forming an annulus about and lying in a plane normal to the axis and between the components, each segment including an arcuate array of discrete, generally linearly extending bristles secured to the segment and extending therefrom at angles offset from radii of the segments, each of the segments having opposite ends along radii thereof for substantial registration with ends of adjoining segments such that, upon assembly of the segments into an annulus, the opposed ends of each pair of adjoining segments lie substantially along a radius of the annulus with the bristles extending at angles offset from radii of the segments.

In a further preferred embodiment according to the present invention, there is provided a rotary machine comprising a rotatable component, a component fixed against rotation, the components lying about a common axis, a brush seal about the axis and between the components, the brush seal including a plurality of arcuate segments forming an annular ring about the axis, each segment having opposite ends having end faces along radii of the axis for substantial registration with end faces of adjoining segments, such that the opposed end faces of each pair of adjoining segments lie substantially along a radius of the ring about the axis, with each segment having an arcuate array of discrete, generally linearly extending bristles secured thereto and extending from the segment at angles offset from radii of the segments at the circumferential location of the bristles.

Accordingly, it is a primary object of the present invention to provide a novel and improved brush seal and combination labyrinth-brush seal for sealing between components rotatable relative to one another and particularly for retrofitting brush seals into labyrinth seals segmented for movement radially by spring or pressure forces.

BRIEF DESCRIPTION OF THE DRAWINGS

FIG. 1 is a schematic illustration of a sealing ring segment illustrating a labyrinth seal about a rotor;

FIG. 2 is a schematic illustration of a labyrinth seal between a sealing ring segment and the covers for buckets or blades of a rotating component;

BEST MODE FOR CARRYING OUT THE INVENTION

Figure 3:
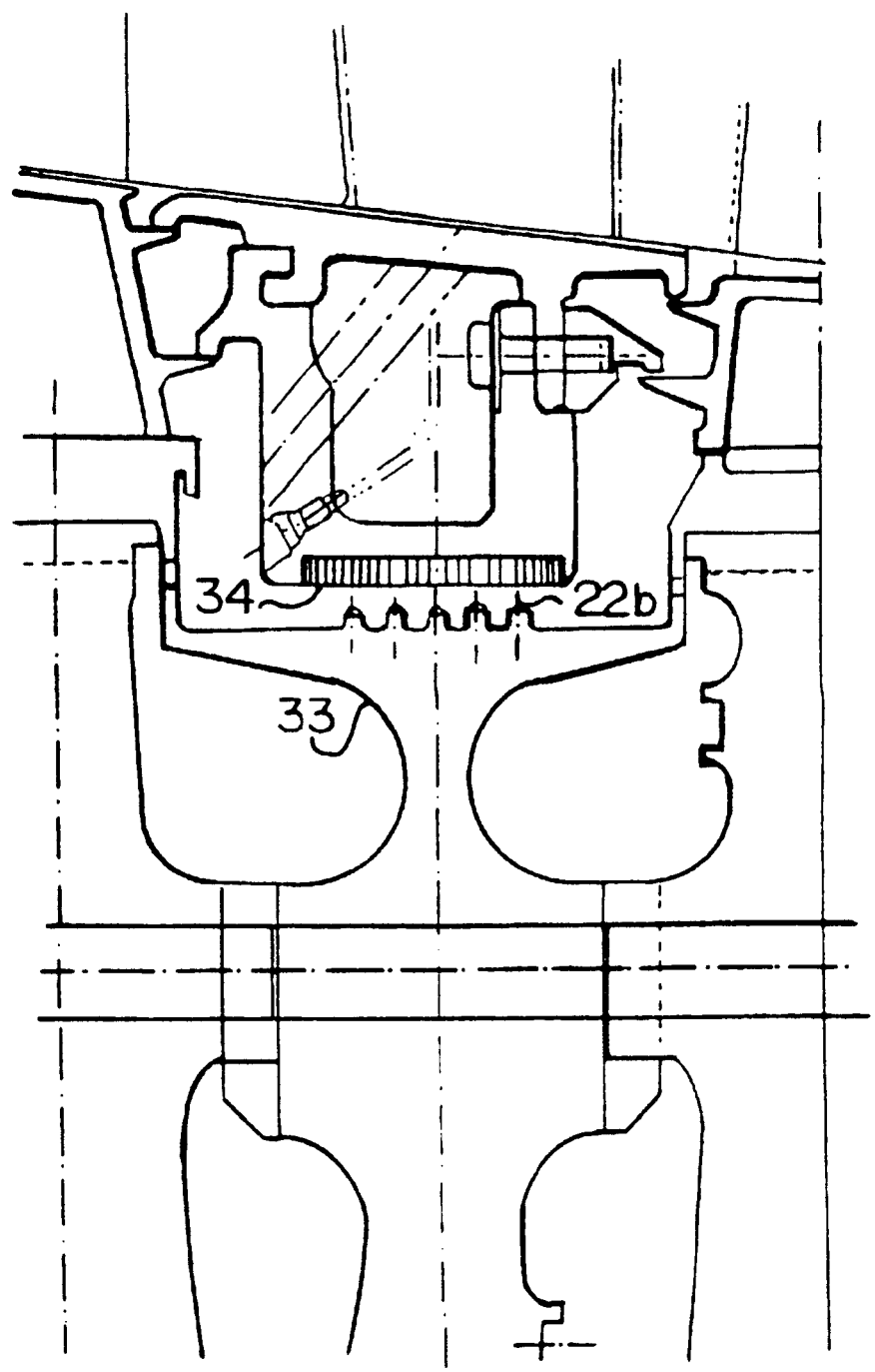
FIG. 3 is a schematic illustration of a turbine wheel illustrating a labyrinth seal between the wheel and a fixed component of the turbine.

Referring now to the drawing figures, particularly to FIG. 1, there is illustrated a portion of a rotary machine, for example, a steam turbine, having a turbine shaft 10 disposed in a turbine housing 12 and which shaft 10 is supported by conventional means, not shown, within turbine housing 12. A labyrinth seal, generally designated 14, between the rotating shaft 10 and the stationary housing 12, includes a seal ring 16 disposed about shaft 10 separating high and low pressure regions on axially opposite sides of the ring. It will be appreciated that while only one seal 16 is disclosed, typically multiple-stage labyrinth seals are provided about rotor shafts. Each seal ring 16 is formed of an annular array of a plurality of arcuate seal elements 18 having sealing faces 20 and a plurality of radially projecting, axially spaced teeth 22. The teeth are of a hi-lo design for obtaining close clearances with the radial projections or ribs 24 and the grooves 26 of the shaft 10. The labyrinth seal functions by placing a relatively large number of barriers, i.e., the teeth, to the flow of fluid from a high pressure region to a low pressure region on opposite sides of the seal, with each barrier forcing the fluid to follow a tortuous path whereby pressure drop is created. The sum of the pressure drops across the labyrinth seal is by definition the pressure difference between the high and low pressure regions on axially opposite sides thereof. These labyrinth seal ring segments are typically spring-backed and are thus free to move radially when subjected to severe rotor/seal interference. In certain designs, the springs maintain the seal ring segments 16 radially outwardly away from the rotor, for example, during startup and shutdown, with fluid pressure being supplied between the seal ring segments and the rotor housing to displace the seal ring segments radially inwardly to obtain a lesser clearance with the rotor, i.e., close the seals, after the rotor has been brought up to speed.

FIG. 2 illustrates a similar arrangement of a labyrinth seal employed at the tip of the rotating blades or turbine buckets for the rotating machine. Thus, in FIG. 2, the labyrinth seal teeth 22a lie in sealing relation to a bucket cover 30 formed on one or more turbine buckets 32. The principal of operation of the labyrinth seal at this location is similar as described above.

FIG. 3 illustrates a typical honeycomb-type labyrinth seal, for example, in a gas turbine. The labyrinth seal teeth 22b are mounted on the rotor wheel 33 and lie in radial opposition to a honeycomb structure 34 forming part of the stator. Thus, it will be appreciated that the labyrinth seal teeth may be disposed on the rotating component of the rotary machine.

Figure 4:
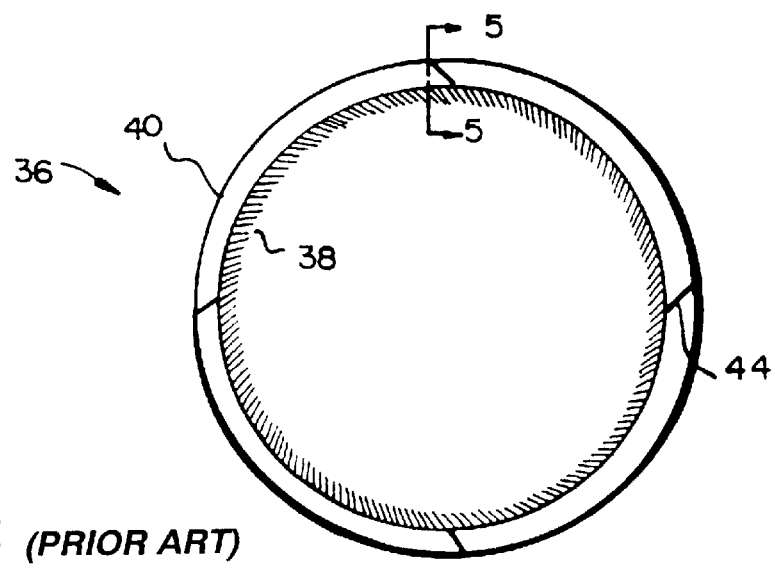
FIG. 4 is an end elevational view of a segmented brush seal of the prior art.
Figure 5:
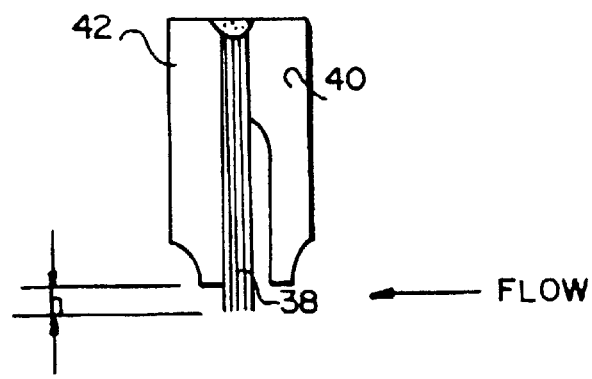
FIG. 5 is an enlarged cross-sectional view thereof taken generally about on line 5—5 in FIG. 4.

Referring now to FIGS. 4 and 5, a typical brush seal, generally designated 36, includes a plurality of bristles 38 extending generally in a radial direction and which bristles 38 are disposed or sandwiched between a pair of seal plates 40 and 42. The bristles are generally formed of alloy steel wire drawn to a diameter of 0.002–0.006 inches, although larger-diameter wires for use in higher pressure environments may be used. From a review of FIG. 5, it will be seen that the backing plate 42 prevents deflection of the bristles 38 under the loading from an upstream direction of the flow, while the distal ends of the bristles project from the distal edge of the plate 42 to engage the opposite component, e.g., the rotating shaft or wheel of a rotary machine. The bristles 38 are preferably welded between the plates 40 and 42. Additionally, it will be seen from a review of FIG. 4 that the bristles and plates are provided in segments about the circumference of the axis of the rotating machine.

Referring to FIG. 5, the bristles project from the distal end of backing plate 42 a distance h which corresponds to the maximum deflection of the rotor in a radial direction. Consequently, the distance h must be a minimum corresponding to that maximum deflection and is dependent on the expected relative radial deflection for the specific machine and seal location. It may be on the order of 0.040 inches. Note also that the upstream plate 40 is useful for maintaining the bristles in place during seal fabrication, although plate 40 is not necessary to the seal when in use if axial space is at a premium. It will also be noted in FIG. 4 that the bristles 38 extend along paths which are misaligned with the radius of the rotary machine. Thus, the bristles extend at an angle, preferably a common angle of approximately 30–60° to accommodate radial excursions of the shaft whereby the bristles may deflect without buckling.

Referring back to FIG. 4, it will be seen that the seal plates 40 and 42 form a plurality of arcuate segments about the seal. As indicated, the adjoining end surfaces of the seal segments register and engage with one another along angled end faces corresponding to the angle of the bristles. That is, the end faces of the adjoining segments are cut at complementary common angles of approximately 30–60° relative to radii of the segments to correspond to the angle of the bristles. While this affords a satisfactory seal and a continuous 360° array of bristles about the seal, a brush seal of this type cannot be accommodated in labyrinth-type seals or retrofitted in labyrinth-type seals where the labyrinth seal segments per se are movable radially inwardly and outwardly under spring or fluid pressure.

Figure 6:
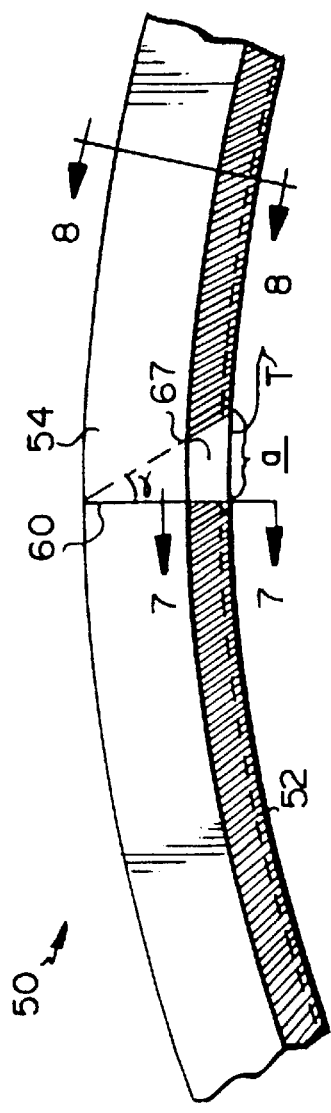
FIG. 6 is an enlarged fragmentary view illustrating a plurality of brush seal segments aligned to form a ring about an axis.
Figure 7:
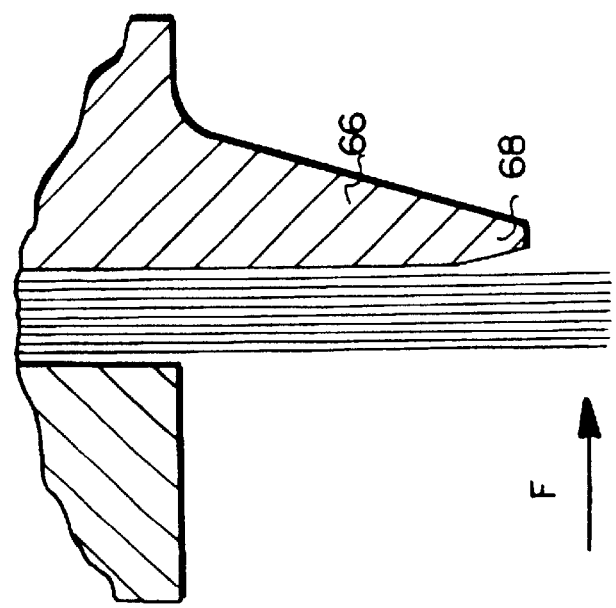
FIG. 7 is an enlarged cross-sectional view taken generally about on line 7—7 in FIG. 6.
Figure 8:
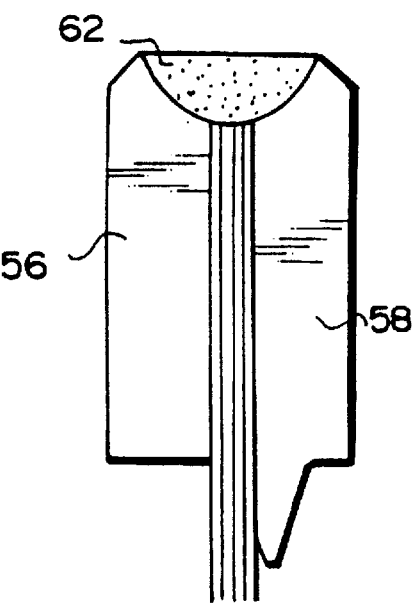
FIG. 8 is an enlarged cross-sectional view taken generally about on line 8—8 in FIG. 6.

In accordance with the present invention and referring to FIG. 6, the brush seal 50 includes a plurality of bristles 52 extending at the typical angle, i.e., 30–60° relative to radii of the brush seal, i.e., the bristles at each circumferential position along each segment extend at a generally common angle relative to a radius extending to the bristles at such circumferential position. However, the individual brush seal segments 54 comprised of one or both of seal plates 56 and 58 have end surfaces formed along a radii of the brush seal. That is, the end surface 60 of each segment 54 lies along a radius relative to the axis of the components being sealed. This permits the segment 54 to move radially inwardly and outwardly relative to one another as necessary for labyrinth seal segments in certain turbine applications. It will also be appreciated from a review of FIG. 8 that the bristles 52 located between the seal plates 56 and 58 are secured at common ends to the plates and to one another by a weld 62. With that construction, it will be appreciated that there will be an area adjacent the adjoining segments 54 which do not have bristles, i.e., are void of bristles. That is, the bristles at the end of one segment are cut along the radial line of the segment, while the bristles of the adjoining end segment, because of the "cant" of the bristles, project at a distance a spaced from the juncture of the segments. Stated differently, the angled bristles 52 of one segment 54 immediately adjacent one end of such segment extend from one diameter to another diameter of the segment at an acute angle a relative to the end face of the segment, the latter extending along a radius of the segment. The bristles at the end of the adjoining segment are cut along a radius of the segment and hence terminate along the radial extending end face of the adjoining segment. This leaves a generally triangular area T at the end of each segment without or void of bristles where that segment joins with an adjacent segment.

However, it has been found that the provision of a backing plate in the form of a labyrinth tooth profile and which labyrinth tooth profile extends 360° about the seal provides full sealing capability about the axis. Thus, the backing plate may comprise a labyrinth tooth 67 which extends the full 360° about the axis of the components being sealed. The lack of bristles at the ends of the seal segments does not seriously compromise or degrade the sealing capability. Note also that the bristles are supported against the labyrinth tooth 66, at least to the point where the tooth is tapered as at 68. Consequently, where brush seals are retrofit to labyrinth seal segments that are either spring-backed or held in place by pressure forces, the individual segments are free to move radially independently of one another, while the many benefits of a brush seal are provided without serious sealing degradation.

Figure 9:
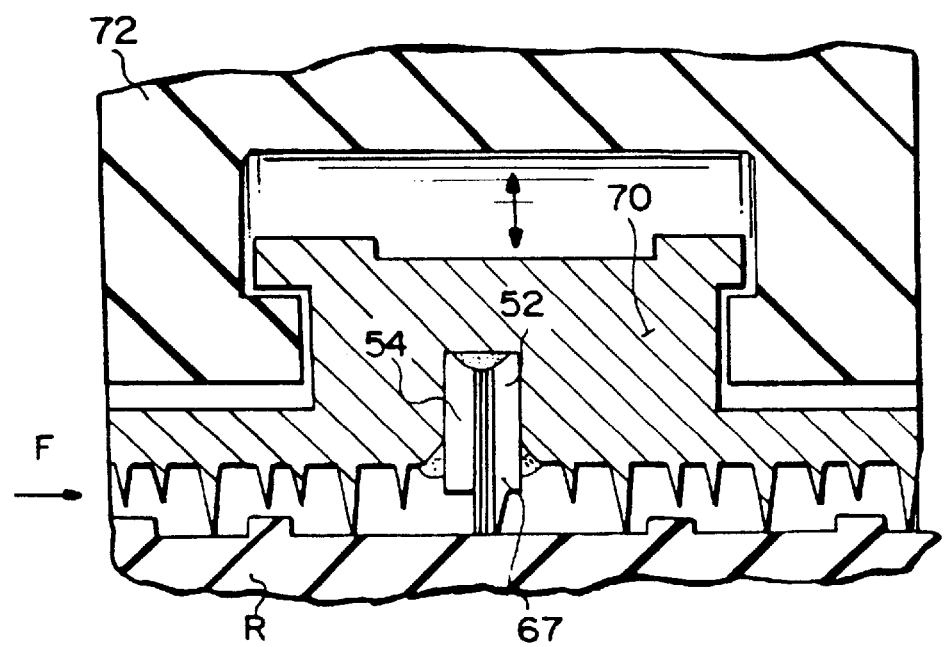
FIG. 9 is a schematic illustration of a combined labyrinth brush seal of the present invention between sealing ring segments and a rotor.

Referring to FIG. 9, there is illustrated an example of a brush seal according to the present invention incorporated as a retrofit or as original equipment in a labyrinth seal. Thus, the labyrinth seal segments 70 about rotary shaft R may be removed from housing 72 and one or more of the teeth of the labyrinth seal replaced with a brush seal. Thus, in the illustrated form, the centrally-located labyrinth seal tooth is removed and a groove is formed for receiving the brush seal segments 54. In the direction of flow indicated at F, the labyrinth tooth 67 formed on one of the seal plates lies on the downstream side of the bristles 52 and the entire brush seal including the segments illustrated in FIG. 6 may be welded into place. With the end faces of the brush seal segments 54 lying parallel to the end faces of the labyrinth seal segments at like circumferential positions, it will be appreciated that the combined labyrinth seal segments and brush seal segments may move radially inwardly and outwardly with the tips of the bristles engaging the rotor R substantially throughout the full 360° circumference of the rotor, with the exception of those small areas T at the ends of the seal segments where bristles do not occur. The seals at those areas are provided solely by the labyrinth tooth 67.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An annular labyrinth/brush seal combination for disposition between a rotatable component having an axis of rotation and another component about said axis, comprising:

a plurality of non-rotatable arcuate seal ring segments for forming an annulus about and lying in a plane normal to said axis and between said components, each said seal ring segment including a plurality of arcuately extending radially projecting labyrinth seal teeth axially spaced from one another and an arcuate array of discrete, generally linearly extending bristles secured to said seal ring segment, said array of bristles being disposed between a pair of axially adjacent labyrinth teeth, said bristles extending generally in a plane normal to said axis and terminating in tips for sealing engagement with the rotatable component;

each of said seal ring segments having opposite ends along radii thereof for substantial registration with ends of adjoining seal ring segments such that, upon assembly of the seal ring segments into an annulus, the opposed ends of each pair of adjoining seal ring segments lie substantially along a radius of the annulus.

2. A seal according to claim 1 including one labyrinth tooth formed on and extending radially from each segment forming a backing for said bristles on one side thereof, said one tooth having a circumferentially extending edge set back from tips of said bristles, said bristles engaging one another and said one labyrinth tooth to prevent deflection of said bristles in an axial direction toward said one labyrinth tooth whereby the bristles are maintained generally in said plane and said tips in sealing engagement with the rotatable component.

3. A seal according to claim 1 wherein each segment includes a pair of arcuate elements on opposite sides of the bristles with tips of the bristles extending beyond circumferentially extending edges of said elements, at least one of said elements forming a labyrinth tooth and extending radially from said segment, said bristles engaging one another and said one labyrinth tooth to prevent deflection of said bristles in an axial direction toward said one labyrinth tooth whereby the bristles are maintained generally in said plane and said tips in sealing engagement with the rotatable component.

4. A seal according to claim 1 including a groove formed in an arcuate face of each said segment and from which face said teeth project, said array of bristles being disposed in said groove, said bristles engaging one another and one of said labyrinth teeth to prevent deflection of said bristles in an axial direction toward said one labyrinth tooth whereby the bristles are maintained generally in said plane and said tips in sealing engagement with the rotatable component.

5. A method of forming an arcuate labyrinth brush seal combination between a rotatable component having an axis of rotation and another component fixed about said axis wherein the seal combination includes a labyrinth seal segment having a surface with a plurality of radially extending labyrinth teeth at axially spaced positions along said segment for sealing between high and low pressure regions on opposite axial sides of said seal, comprising the steps of:

forming a groove in said surface of said segment at a location spaced axially from said teeth;

securing a brush seal assembly including an arcuate array of discrete, generally linearly extending bristles and at least one labyrinth tooth in said groove with said bristles (i) extending in a plane generally normal to said axis, (ii) backed against said one tooth on a side thereof facing said high pressure region and (iii) terminating in tips extending radially beyond an arcuate edge of said at least one tooth for sealing engagement with the rotatable component thereby forming a combined labyrinth brush seal; and orienting said one tooth in said groove to prevent deflection of said bristles in an axial direction toward said one tooth and maintain the bristles generally in said plane with said tips in sealing engagement with the rotatable component.

6. A method according to claim 5 including disposing said bristles at angles offset from radii of said segment.

7. An annular labyrinth/brush seal assembly, comprising:

a rotatable component having an axis of rotation;

a component fixed about said axis radially outwardly of said rotatable component;

a plurality of non-rotatable arcuate seal ring segments for forming an annulus about and lying in a plane normal to said axis and between said components, said seal ring segments being carried by said fixed component for movement in radially inward and outward directions, respectively, toward and away from said rotating component, each said seal ring segment having a plurality of arcuately extending radially projecting labyrinth seal teeth axially spaced from one another and an arcuate array of discrete, generally linearly extending bristles secured to said seal ring segment, said array of bristles being disposed between a pair of axially adjacent labyrinth teeth, said bristles extending generally in a plane normal to said axis and terminating in tips in sealing engagement with the rotatable component;

each of said seal ring segments having opposite ends along radii thereof for substantial registration with ends of adjoining seal ring segments such that, upon assembly of the seal ring segments into an annulus, the opposed ends of each pair of adjoining seal ring segments lie substantially along radii of the annulus.

8. A seal assembly according to claim 7 including one labyrinth tooth formed on and extending radially from each segment forming a backing for said bristles on one side thereof, said one tooth having a circumferentially extending edge set back from tips of said bristles, said bristles engag ing one another and said one labyrinth tooth to prevent deflection of said bristles in an axial direction toward said one labyrinth tooth and maintain the bristles generally in said plane with said tips in sealing engagement with the rotatable component.

9. A seal assembly according to claim 7 wherein each segment includes a pair of arcuate elements on opposite sides of the bristles with tips of the bristles extending beyond circumferentially extending edges of said elements, at least one of said elements forming a labyrinth tooth and extending radially from said segment, said bristles engaging one another and said one labyrinth tooth to prevent deflection of said bristles in an axial direction toward said one labyrinth tooth and maintain the bristles generally in said plane with said tips in sealing engagement with the rotatable component.

10. A seal assembly according to claim 7 including a groove formed in an arcuate face of each said segment and from which face said teeth project, said array of bristles being disposed in said groove, said bristles engaging one another and one of said labyrinth teeth to prevent deflection of said bristles in an axial direction toward said one labyrinth tooth and maintain the bristles generally in said plane with said tips in sealing engagement with the rotatable component.

\* \* \* \* \*

UNITED STATES PATENT AND TRADEMARK OFFICE
CERTIFICATE OF CORRECTION

PATENT NO. : 6,435,513 B2
DATED : August 20, 2002
INVENTOR(S) : Skinner et al.

It is certified that error appears in the above-identified patent and that said Letters Patent is hereby corrected as shown below:

<u>Column 6,</u>
Line 28, kindly delete "at a distance a" and insert -- at a distance α -- therefor.
Line 32, kindly delete "at an acute angle a" and insert -- at an acute angle α -- therefor.

Signed and Sealed this

Fourth Day of March, 2003

JAMES E. ROGAN
*Director of the United States Patent and Trademark Office*